United States Patent
Michaelis

(10) Patent No.: US 8,386,252 B2
(45) Date of Patent: Feb. 26, 2013

(54) ESTIMATING A LISTENER'S ABILITY TO UNDERSTAND A SPEAKER, BASED ON COMPARISONS OF THEIR STYLES OF SPEECH

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 274 days.

(21) Appl. No.: 12/781,133

(22) Filed: May 17, 2010

(65) Prior Publication Data

US 2011/0282669 A1    Nov. 17, 2011

(51) Int. Cl.
G10L 17/00 (2006.01)
G10L 15/00 (2006.01)
G10L 21/00 (2006.01)

(52) U.S. Cl. .................. 704/246; 704/231; 704/270

(58) Field of Classification Search .............. 704/231, 704/246, 270, 8; 379/265.12
See application file for complete search history.

(56) References Cited

U.S. PATENT DOCUMENTS

| | | | | |
|---|---|---|---|---|
| 6,847,714 B2 * | 1/2005 | Das et al. | | 379/265.12 |
| 7,180,997 B2 * | 2/2007 | Knappe | | 379/387.01 |
| 7,349,527 B2 * | 3/2008 | Yacoub et al. | | 379/88.11 |
| 7,372,952 B1 * | 5/2008 | Wu et al. | | 379/220.01 |
| 7,539,296 B2 | 5/2009 | Basson et al. | | |
| 7,653,543 B1 * | 1/2010 | Blair et al. | | 704/270 |
| 8,180,662 B2 * | 5/2012 | Minert et al. | | 705/7.13 |
| 2002/0095292 A1 * | 7/2002 | Mittal et al. | | 704/270 |
| 2005/0286705 A1 | 12/2005 | Contolini et al. | | |
| 2006/0126798 A1 * | 6/2006 | Conway | | 379/1.03 |
| 2006/0289622 A1 | 12/2006 | Khor et al. | | |
| 2008/0147404 A1 | 6/2008 | Liu et al. | | |
| 2009/0232296 A1 | 9/2009 | Jaiswal et al. | | |

OTHER PUBLICATIONS

Combined Search and Examination Report for UK Patent Application No. GB1108150.2, dated Sep. 1, 2011.
National Science Foundation ""Baldi" the Virtual Tutor Helps Hearing-Impaired Children to Lean Speech" Office of Legislative and Public Affairs; NSF Press Release 01-19—Mar. 6, 2001; available at http://www.nsf.gov/od/lpa/news/press/01/pr0119.htm; printed May 14, 2010.
Official Action with English translation for China Patent Application No. 201110184213.0, dated May 8, 2012 8 pages.

* cited by examiner

*Primary Examiner* — Jesse Pullias
(74) *Attorney, Agent, or Firm* — Sheridan Ross P.C.

(57) ABSTRACT

An automated telecommunication system adjunct is described that "listens" to one or more participants styles of speech, identifies specific characteristics that represent differences in their styles, notably the accent, but also one or more of pronunciation accuracy, speed, pitch, cadence, intonation, co-articulation, syllable emphasis, and syllable duration, and utilizes, for example, a mathematical model in which the independent measurable components of speech that can affect understandability by that specific listener are weighted appropriately and then combined into a single overall score that indicates the estimated ease with which the listener can understand what is being said, and presents real-time feedback to speakers based on the score. In addition, the system can provide recommendations to the speaker as to how improve understandability.

20 Claims, 3 Drawing Sheets

ESTIMATING A LISTENER'S ABILITY TO UNDERSTAND A SPEAKER, BASED ON COMPARISONS OF THEIR STYLES OF SPEECH

FIELD

One exemplary aspect is directed toward improving communications. Even more particularly, an exemplary aspect is directed toward aiding understandability between parties in a communication environment, such as on a conference call.

BACKGROUND

Even when two people are speaking the same language, and have a good command of that language's vocabulary and grammar, differences between them in their manner of speaking, e.g., differences in accent, pronunciation accuracy, prosody, speech, pitch, cadence, intonation, co-articulation, syllable emphasis, syllable duration, and the like, can affect the ease with which they understand each other's speech. Although such differences can occur among people who are native speakers of the same language, the problem can be especially noticeable when a talker's speech patterns have been influenced by the talker being accustomed to a language other than the one to which the listener is accustomed.

SUMMARY

A particularly interesting scenario in which this occurs is in off-shore contact centers.

When conversations are face-to-face between people who have different manners of speaking, talkers can observe listeners and receive non-verbal feedback as to whether they are being understood. A talker who perceives that the listener is having difficulty can make adjustments to his or her style of speaking, and then perceive from the subsequent non-verbal feedback whether the adjustment(s) have been helpful. A key point is that, in face-to-face conversations, there is a continuous feedback-and-adjustment loop.

As is true with systems in a wide variety of other domains, the lack of continuous feedback-and-adjustment loop can be expected to result in "drift"—in this case, the speaker deviating further and further away from the style of speech that is most understandable by the listener. Factors that might be expected to cause this drift include the talker's emotional state, the desire to make a point quickly, and whether the talker is making a conscious effort to speak in a listener-friendly manner. The problem addressed by an exemplary embodiment discussed herein is that the only feedback mechanism that exists in voice-only telephone conversations is verbal feedback from the listener—an option that is rarely used because it interrupts the flow of conversations and is considered by some people to be rude.

Available technologies are directed toward computer-based systems that "listen" to people who are learning to speak a foreign language and provide them feedback about the student's pronunciation errors. Similar systems are used by people who are deaf, giving them guidance about how to improve the understandability of their speech.

A rudimentary difference between an exemplary embodiment discussed herein and the automated techniques that assist students, is that the assistive software for students compares the student's speech against a template that describes perfect pronunciation. By contrast, an exemplary embodiment analyzes the speaking styles of one or more parties on a call, and provides feedback to the talker that is based on the extent to which his or her speaking style differs from that of the listener. For example, it may be very hard to for an American who has learned French from books to understand when someone is speaking perfect French, but relatively easy to understand French when spoken with an exaggerated American-style accent similar to that of the listener, at a speech similar to the speed that the listener speaks French—i.e., very slowly.

Another interesting scenario is in the field of air-traffic control. More specifically, all controllers worldwide are required to speak English. This clearly presents a potentially hazardous situation and provides another environment in which the techniques disclosed herein may be useful. In this scenario, the idea of a Chinese national, speaking English to a German national, is not that far-fetched.

Accordingly, an exemplary aspect is directed toward an automated telecommunication system adjunct that "listens" to one or more participant's styles of speech, identifies specific characteristics that represent differences in their styles, notably the accent, but also one or more of pronunciation accuracy, speed, pitch, cadence, intonation, co-articulation, syllable emphasis, syllable duration, grammar, vocabulary (or recognition of a limited vocabulary) and idioms and utilizes, for example, a mathematical model in which the independent measurable components of speech that can affect understandability by that specific listener are weighted appropriately and then combined into a single overall score that indicates the estimated ease with which the listener can understand what is being said, and presents real-time feedback to speakers based on the score. In addition, the system can provide recommendations to the speaker as to how improve understandability.

In accordance with another exemplary embodiment, an analysis can be performed to determine if signal degradation may also be contributing to intelligibility problems, such as packet loss, latency, noise and the like. Moreover, conversational dynamics can also be analyzed, such as whether a listener is saying "can you say that again" or, in contrast, appears to be fully engaged in the conversation, both of which have implications as to the listener's ability to understand the speaker.

In speech recognition technologies, Hidden Markov Models (HMM) are used to analyze samples, and perform a statistical analysis thereon. Moreover, the models are used as a matching process for comparison to a template. In general, Hidden Markov Models are statistical models which output a sequence of symbols or quantities. A speech signal modeled by HMM can be viewed as a piece-wise stationary signal or a short-term stationary signal. That is, one could assume in a short-time in the range of, for example, 10 milliseconds, speech could be approximated as a stationary process. Speech could thus thought of as a Markov Model for many stochastic processes.

Another advantage to HMM's is that they can be trained automatically and are simply and computationally feasible to use. In speech recognition, the HMM could output a sequence of N-dimensional real-value vectors, outputting one of these every x milliseconds. The vectors would consist of cepstral coefficients, which are obtained by taking a Fourier transform of a short time window of speech and decorrelating the spectrum using a cosign transform, then taking the first (most significant) coefficients. (A mel-frequency cepstrum (MFC) is a representation of the short-term power spectrum of a sound, based on a linear cosine transform of a log power spectrum on a nonlinear mel scale of frequency—Mel-frequency cepstral coefficients (MFCCs) are coefficients that collectively make up an MFC. MFCCs are commonly used as features in speech recognition systems, such as the systems which can automatically recognize numbers spoken into a telephone. They are also common in speaker recognition, which is the task of recognizing people from their voices.)

The HMM will tend to have in each state a statistical distribution that is a mixture of diagonal covariant gaussians which will give a likelihood for each observed vector. Each word, or, for more general speech recognition systems, each phoneme, will have a different output distribution; a Hidden Markov model for a sequence of words or phonemes is made by concatenating the individual trained hidden Markov Models for the separate words and phonemes.

One underlying assumption of an aspect described herein is that two people who are speaking heavily accented English will have no trouble understanding each other if the accents are determined to be identical, or very similar. On the other hand, if the system determines that the speaking styles differ significantly, for example, if one person is speaking English with an Indian accent and the other is speaking English with a Spanish accent, the system could provide real-time feedback to the speaker regarding the estimated "understandability" of his or her speech by the listener.

The key aspect is the ability to provide feedback in real-time and have this feedback be continuous in nature. Reiterating any problems discussed above, the lack of a continuous feedback-and-adjustment loop can be expected to result in the speaker drifting further and further away from the style of speech that is most understandable by the listener.

In a simple implementation, the feedback to the speaker could be a continuously updated "understandability" score that could appear as a number or as a sliding bar or other indicia of understandability on, for example, a telephone's alpha numeric display. In more sophisticated implementation, utilizing a standard alpha-numeric display and/or graphical user interface, the system would suggest specific actions the speaker could take, such as "slow down" or "emphasize the "h" sound in words that begin with an h."

An alternative implementation could provide the feedback in a non-visual format, such as via a "whisper" mechanism that could be audible only to the person who is speaking Feedback mechanisms with much greater sophistication become feasible if a display is associated with the user's telephony endpoint is able to present complex images that can be refreshed frequently. For example, rather than limit the feedback to a signal uni-dimensional understandability score, a display of this sort could supplement the understandability score with a multi-dimensional view in which the independently measurable components that go into the overall understandability are shown separately. For example, feedback could be provided by a bar chart in which the scores associated with the independent factors are indicated in separate bars that expand and contract. Speakers can observe the individual bars, attempt to make factor-specific adjustments to their speech, and then observe whether the adjustments have been beneficial. Keeping in mind that some factors will have a greater influence than others on the understandability of the speech, and noting also that the factors of importance can be expected to change depending on the nature of the speaker/listener mismatch, an exemplary implementation of this display would indicate which of the factors should be regarded by the speaker as a high or higher priority.

Another exemplary embodiment might include population-specific templates that could serve as the basis for speaker/listener comparisons when it is not possible to sample the listener's style of speech. As an example of where such an approach might be employed is that a generic "German listener" template could be employed as an aid to a Chinese speaker who is doing a presentation in English to a German audience. Similarly, the comparisons need not necessarily be performed in real-time, but could be based on a profile associated with a speaker that is derived from one or more previous conversations the speaker has had.

In accordance with another exemplary embodiment, and expanding upon the implementation above that recognizes that speaking styles may change based on the animation of the speaker, content that the speaker is speaking of, and the like, multiple profiles may be associated with a user with each profile tied to a specific style. For example, if the speaker is speaking to a friend, which could be ascertained through contact or caller ID information, a starting point could be a profile based on one or more of the listener, context, and content of the conversation. For example, if participant A is calling participant B, and discussing a favorite hobby, profiles associated with both participant A and B can be retrieved with these profiles being specific to the hobby being discussed. The historical profile information can be used as a baseline for providing feedback based on one or more prior conversations. In a similar manner, if participant A is contacting participants B and C about a work-related item particular to a specific project, upon commencement of the call the speaker could be reminded as to what understandability issues were present during one or more prior conversations to assist with a more immediate understanding by the other two participants.

Accordingly, an exemplary aspect is directed toward analyzing speaking styles of one or more parties on, for example, a telephone call, and providing actionable, continuous, real-time feedback to all speakers that is based on the extent to which their speaking differs from that of the listeners.

Further aspects are directed toward utilizing conversational dynamics to assist with providing feedback to a speaker about the understandability of their speaking.

Still further aspects are directed toward utilizing channel characteristics as an input and analyzing understandability of a speaker.

Even further aspects are directed toward providing real-time feedback in one or more of a visual, non-visual, and/or spoken format to a speaker about the understandability of their speaking.

Even further aspects are directed toward utilizing population-specific templates to serve as a basis for speaker/listener comparisons when it is not possible to sample the listener's style of speech directly.

Even further aspects are directed toward utilizing population-specific templates to aid in a situation where a speaker of one nationality is providing a presentation to listeners of another nationality.

Even further aspects are directed toward detecting differences in styles of speaking such as accent, pronunciation accuracy, speed, pitch, cadence, intonation, co-articulation, syllable emphasis, and syllable duration, and providing an indication as to mutual understandability of one or more parties engaged in conversation.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), the embodiments are not limited to use with any particular type of communication system or configuration of system elements. Those skilled in the art will recognize that the disclosed techniques may be used in any communication application in which it is desirable to provide enhanced understandability of one party by another.

Figure 1:
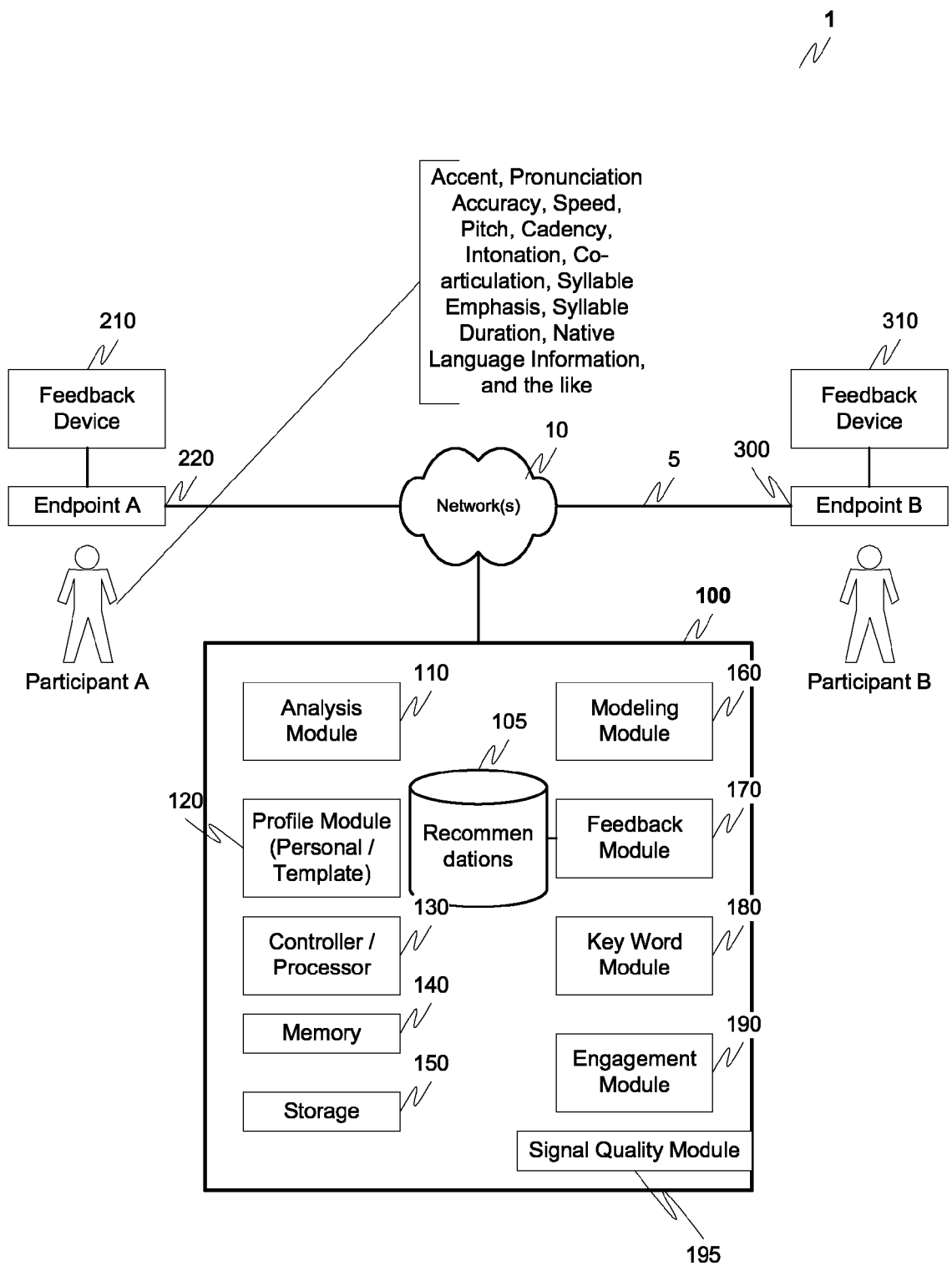
FIG. 1 illustrates an exemplary communications environment.

Referring initially to FIG. 1 an exemplary communication environment 1 will be described in accordance with at least some embodiments. The communication system comprises a communication network connecting a plurality of communication devices optionally to, for example, a conference bridge.

In one embodiment, communication system may include a switch that may include a private branch exchange (PBX) system or any similar type of switching system capable of providing a telephone service to one or more entities such as an enterprise associated with the switch. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with the conference participants, servers, and databases. The switching fabric can provide the functionality to direct incoming and/or outgoing calls to various endpoints and further provides for conferencing capabilities between endpoints.

In another embodiment, such as the air-traffic scenario described above, the endpoints may be wireless radios or comparable communications devices and the communications network a wireless/wired network. In this scenario, the techniques disclosed herein could be implemented in the tower at an airport, or the like. In general, the techniques disclosed herein can be located at any location as appropriate to serve the one or more endpoints.

The communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

FIG. 1 illustrates an exemplary communications environment. The communications environment 1 includes an understandability enhancement system 100, endpoint A 200 with an optional feedback device 210 and endpoint B 300 with option feedback device 310, interconnected by one or more networks 10 and links 5. The understandability enhancement system 100 includes an analysis module 110, a profile module 120, a controller 130, memory 140, storage 150, modeling module 160, feedback module 170, key word module 180, engagement module 190, and signal quality module 195. The understandability enhancement system 100 further includes a recommendations database or repository 105.

As discussed, an exemplary embodiment is directed toward enhancing communications understandability between parties. To facilitate this benefit, one exemplary embodiment utilizes one or more feedback devices associated with an endpoint to provide one or more of audible, video, or multimedia feedback to a person associated with endpoint as discussed hereinafter.

In particular, and in operation, persons, such as participant A associated with endpoint A 200 and participant B associated with endpoint B 300 establish a communication session. The endpoints can be any type of communication device, such as a phone, smart phone, multimedia enabled endpoint, speaker phone, cell phone, or in general, any type of communications device that allows communications over the one or more networks 10 and links 5. For example, the communications can be handled via a public switched telephone network, a packet-switch telephone network, via VOIP, utilizing SIP, or in general any type of communications protocol or modality.

To assist with enhancing understandability, and after or commensurate with commencement of the communication session, the analysis module 110, cooperating the profile module 120, begins monitoring participant A's speech. In addition, the analysis module 110 begins monitoring participant B's speech. As will be appreciated, at the commencement of a communication session there is little to no data available to assist with providing feedback as to the other parties' understandability of the speaker.

Therefore, and in accordance with one exemplary embodiment, and in cooperation with the profile module 120, controller 130, memory 140, and storage 150, one or more of a personal profile and template can be retrieved that have, for example, historical information about a speaker's speech characteristics. These historical examples can be based on, for example, one or more prior conversations, can include a summary of the speech characteristics for that particular speaker, and can optionally be more specific, such as context and/or conversation based. For example, the analysis module 110 can recognize that a communications session is between two parties that have had previous conversation(s). During the one or more prior conversations, understandability information can be complied and stored with the assistance of the profile module 120. Therefore, when the two parties again begin a communication session, this prior historical information can be retrieved and utilized, as discussed hereinafter, to provide feedback to one or more of the parties.

In accordance with one exemplary embodiment, and upon commencement of the communication session, a participant can be provided a synopsis of the historical information with directions on changes in prior speech characteristics that improved understandability by that listener. This type of historical information could be very helpful in reducing the time to improve understandability at the commencement of a communication session.

Alternatively, or in addition, a population-specific template can be imported for one or more of the participants. For example, the population-specific template could be used to serve as an initial basis for speaker/listener comparisons when it may not be possible to sample the listener's style of speech. As an example of where such an approach might be employed, a generic "German listener" template could be employed as an aid to a Chinese speaker who is doing a presentation in English to a German audience.

In a similar manner, these population-specific templates could be used to further enhance initial understandability by providing initial guidelines as to which types of speaking characteristics generally improve understandability between the two nationalities. For example, if a native English speaker, with a New York accent is speaking to a native Japanese listener, an initial instruction to the New York speaker could be to slow down, use shorter sentences, and to reduce the use of idiomatic English. In general, a template can be generated based on any combination of speaker/listener comparisons and this utilize to optionally supplement actual samples taken by the analysis module 110.

As the monitoring of the one or more participants' speech continue, and optionally for each participant, the analysis module 110, cooperating with the controller 130, memory 140, and storage 150, identifies one or more characteristics that represent differences in style, e.g., accent, pronunciation accuracy, speed, pitch, cadence, intonation, co-articulation, syllable emphasis, syllable duration, native language information, and the like. These characteristics can be monitored in real-time, for any portion or all of the communication session, and can further be used to update a profile associated with a participant, or the combination of participants as alluded to above where templates are stored for a communication session between parties.

The modeling module 160 then utilizes one or more independently measurable components of speech that can affect understandability by weighing them and combining them into a single overall score that indicates an estimated ease with which the other participant can understand what is being said. This score can be used as the basis for the feedback module 170 to determine and present feedback to the speaker with one or more recommendations on how to improve understandability by the listener. More specifically, the feedback module 170 then interprets the understandability score that, as discussed, looks at differences between people, that when checked against the recommendations database 105 is correlatable to a recommendation that should enhance understandability. This recommendation can be provided, in cooperation with the feedback module 170, to a feedback device such as the feedback device 210 or feedback device 310.

In accordance with a second exemplary embodiment, the understandability enhancement system 100 is extended to include the situation where there are a plurality of participants, and further include dynamic monitoring and evaluation of one or more of signal degradation, conversation engagement factors and dynamic updating for a communication session.

More specifically, and similar to the embodiment discussed above, each participants' speech is monitored to identify one or more speech characteristics. Alternatively, or in addition, a profile for that participant can be retrieved. Alternatively still, or in addition, a profile for the particular combination of participants can be retrieved. As will be appreciated, if there are multiple participants, it could be difficult to provide recommendations to a speaker where the recommendations may contradict one another based on a plurality of different listeners.

Therefore, in accordance with one exemplary embodiment, the feedback to the speaker can be modified, for example, based on a weighted average of the recommendations for the plurality of listeners. In accordance with another exemplary embodiment, the feedback device is also used to collect information about a participant(s). For example, if the speaker is speaking to an audience at an endpoint, the audience at the endpoint can utilize the feedback device to provide information to the understandability enhancement system 100 such as "we are native Chinese speakers, who would like to listen in English." In a similar manner to information and speech characteristics derived by monitoring the participants speech, this information can also be used in combination with the understandability score to assist the feedback module 170 and making one or more recommendations to a speaker.

For each of the participants, the analysis module 110 then identifies one or more characteristics that represent differences in style, such as accent, pronunciation accuracy, speed, pitch, cadence, intonation, co-articulation, syllable emphasis, syllable duration, native language information, and the like. In addition, and in cooperation with the signal quality module 195, an evaluation is made as to whether signal degradation exists on any one or more of the legs of the communication architecture. Further in addition, the key word module 180 monitors for indicators of a lack of understanding between the parties. For example, the key word module 180 is programmed to look for indicators such as "sorry, can you say that again," "what?", "please repeat what you just said," "can you speak up", or the like. In general, the key word module 180 can be programmed with any number of key words that are usually indicative of the lack of understanding as a listening party. As another example, the key-word module 180 can monitor for the occurrence of utterances such as "huh?" or similar utterances that also generally tend to indicate a lack of understanding, or an inability for the listener to hear the speaker.

One or more of the above indicators are then utilized by the modeling module 160 to determine a score that indicates an estimated ease with which the one or more other participants can understand what is being said. This score is used then by the feedback module 170 cooperating with the recommendations module 105 to determine and present feedback to the speaking participant optionally with recommendations on how to improve understandability. These recommendations can be provided via a feedback device audibly, graphically, as a score, in multimedia, or in general using any communication type(s). In addition, the feedback can be provided via a graphical user interface, via a whisper channel, via a display (not shown), or the like. For example, and depending on the type of feedback device, the sophistication of the feedback recommendations can be varied.

For example, in a simple text-based feedback device, instructions such as slow down, talk louder, and the like, could be utilized to assist with the listening parties' understandability. A language specific example would be if someone who speaks perfect French when speaking to a native English speaker who learned French from textbooks is instructed by the system to "pronounce the silent letters." In more sophisticated graphical user interface type environments, in addition to recommendations, additional information could be optionally provided about the participant(s) at one or more of the various endpoints with this information including not only recommendations, but also general information about the endpoints. For example, information such as how engaged the participant is in the conversation, whether the participant has entered any information such as native language, or the like can be displayed. Moreover, the system can be expanded such that the key word module 180 not only listens for key words or utterances that may indicate a lack of understanding, but in cooperation with a feedback device, the key word module 160 can monitor whether a participant has input information indicating there is a lack of understandability. For example, the feedback device (210, 310), when it is expanded to include input capability, can be programmed such that upon the selection of a particular input, inputs such as speak louder, slow down, I can't hear you, and the like could similarly be used to assist the modeling module 160 and determining with the cooperation of the feedback module 170 what feedback to provide to a speaker.

Figure 2:
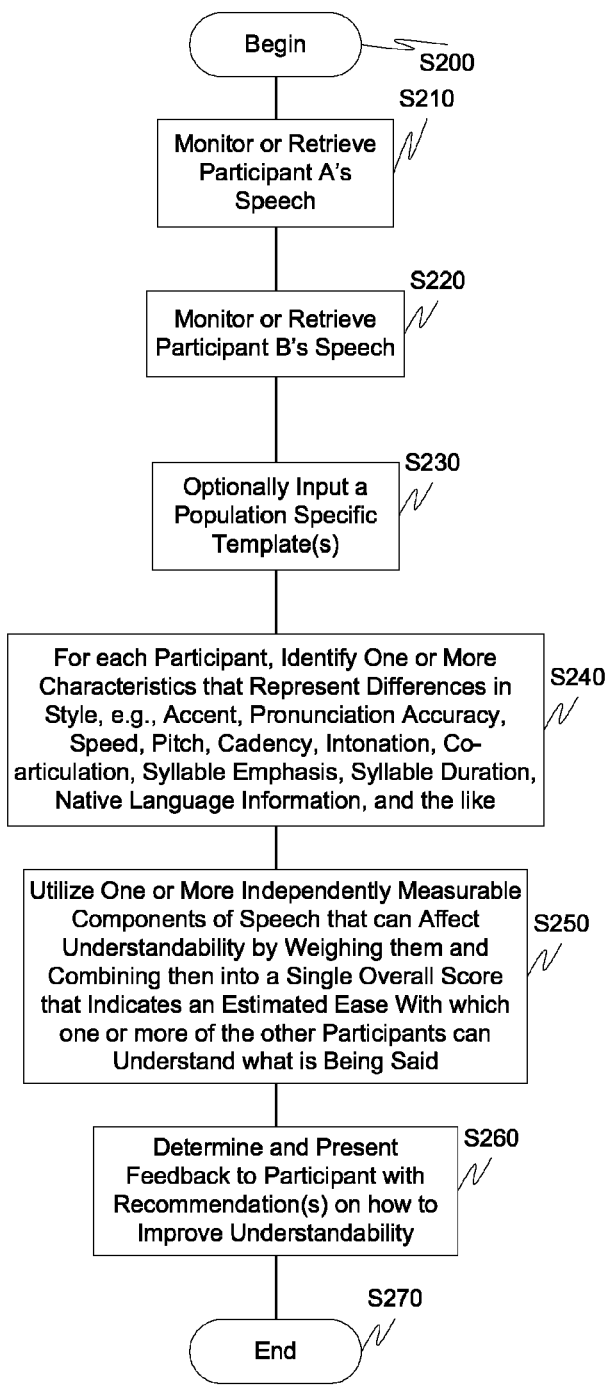
FIG. 2 is a flowchart illustrating an exemplary method for enhancing understandability between two participants.

FIG. 2 illustrates an exemplary method of operation of an understandability enhancement system. In particular, control begins in step S200 and continues to step S210. In step S210, participant A's speech is one or more monitored and retrieved. As discussed, participant A's speech profile can be retrieved from a storage location and this profile utilized to, for example, assist with providing more immediate recommendations, when for example, there is insufficient data of monitored speech to make a recommendation. Next, in step S220, and in a similar manner, participant B's speech is one or more monitored and retrieved. Then, in step S230, a population specific template can optionally be input. Control then continues to step S240.

In step S240, and for each participant, one or more characteristics are identified that represent differences in style such as accent, pronunciation accuracy, speed, pitch, cadence, intonation, co-articulation, syllable emphasis, syllable duration, native language information, grammar, vocabulary, idioms and the like. Then, in step S250, one or more these independently measurable components of speech are utilized by weighting them and combining them into an overall score that indicates an estimated ease with which another participant can understand what is being said. Control then continues to step S260.

In step S260, feedback is determined and presented to the speaking participant with one or more recommendations on how to improve understandability. Control then continues to step S270 where the control sequence ends.

Figure 3:
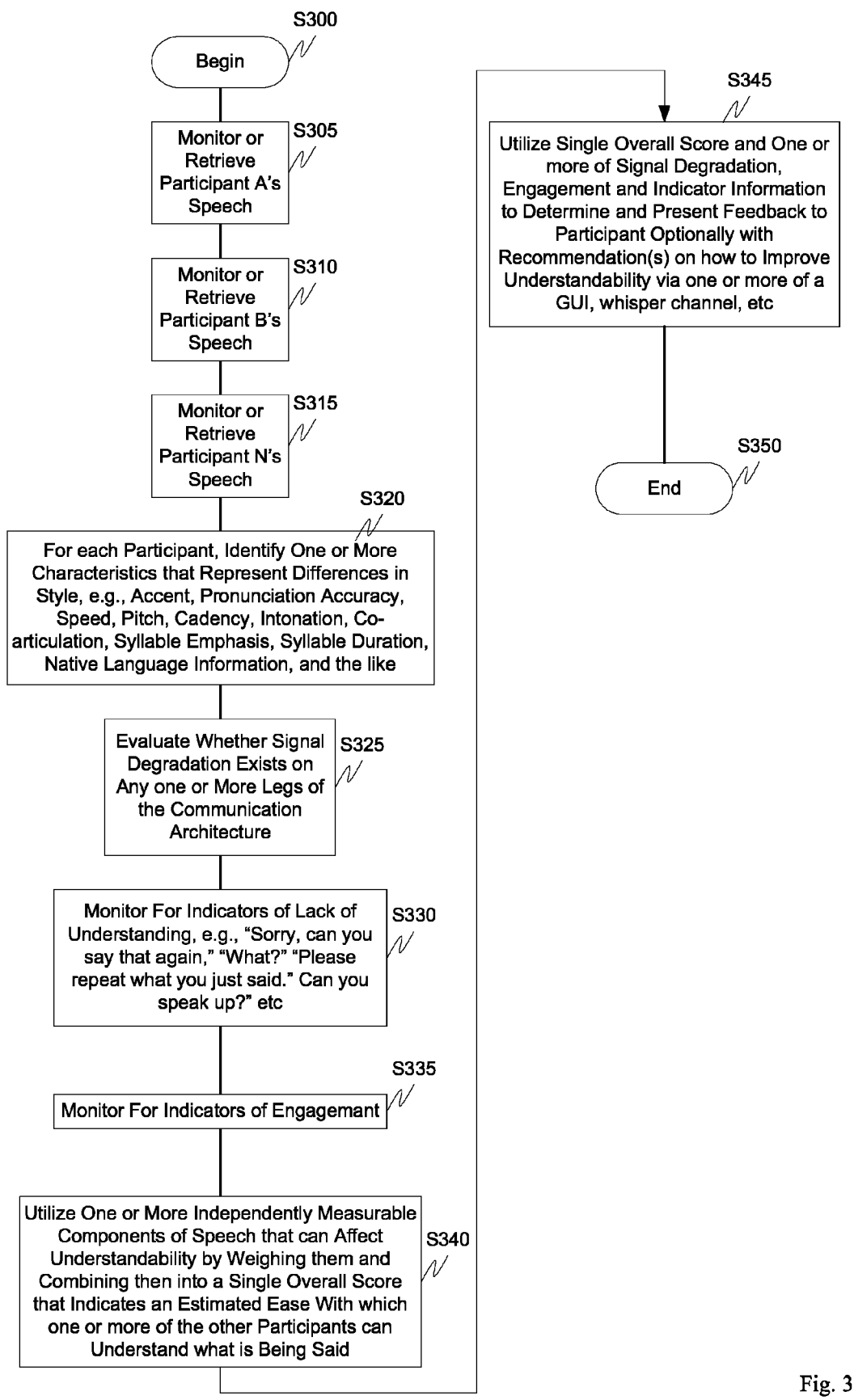
FIG. 3 is a flowchart illustrating an exemplary method for enhancing understandability between several participants.

FIG. 3 outlines an additional exemplary embodiment of the operation of an understandability enhancement system. In particular, control begins in step S300 and continues to step S305. In step S305, participant A's speech is one or more of monitored or retrieved, for example, from a profile. Next, step S310, participant B's speech is one or more of monitored and/or retrieved from a profile. Then, in step S315, one or more additional participant's speech can be monitored and/or retrieved in a similar manner. For each additional participant's speech, the monitoring and/or retrieval can be done on an individual basis, or, for example, can be combined to form a weighted average based on a certain number of the participants. Control then continues to step S320.

In step S320, and for each participant, or for example, for a weighted average of the participants, one or more characteristics are identified that represent differences in style as discussed above. Next, in step S325, an evaluation is made as to whether signal degradation exists on any one or more legs of the communication architecture. This signal degradation information can also be utilized by the modeling techniques to account for situations where the understandability is not based on the speaker's speech characteristics, but rather by poor communications links. This could be especially important in situations where communications channel conditions vary during the course of a communication session with, for example, noise levels getting higher and then receding. Clearly, in this situation, recommendations to a speaker to change their speech patterns or characteristics would have little to no effect on the listener's ability to understand them.

As an optional additional embodiment, this information could be used, for example, to tell the speaker to pause their speaking until the noise falls below an acceptable level. Control then continues to step S330.

In step S330, indicators of a lack of understanding can optionally additionally be monitored throughout the communication session. For example, indicators can be key words, utterances, or in general, any indicator that indicates the listener(s) is having trouble understanding what the speaker has said. Moreover, and in step S335, additional factors can further be considered such as the degree of engagement of a listener in a conversation. For example, the system can be programmed to recognize if there is an active conversation where a plurality of participants are exchanging ideas in a rapid fashion, the likelihood is that there is a high of degree of mutual understanding between the participants. Alternatively, if a speaker is not receiving any feedback from one or more listeners, this lack of engagement can also be utilized as an indicator that there may be a lack of understanding by the listener attributable to one or more of the speaker's speech characteristics, communication channel degradation problems, an inability to hear the speaker based on volume problems, or the like. Control then continues to step S340.

In step S340, and in addition to the above monitored characteristics, the speech components that affect understandability are assessed and a score determined that indicates an estimated ease with which one or more of the other participants can understand what is being said. Next, in step S345, this score and one or more of signal degradation information, engagement information, and indicator information is used to determine and present feedback to the speaker optionally with one or more recommendations as to how to improve understandability. As with the prior embodiment, these one or more recommendations can be provided graphically, audibly, or the like, via one of more feedback devices such as in a graphical user interface, whisper channel, or the like. Control then continues to step S350 where the control sequence ends.

The various embodiments include components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhanced communications understandability. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for enhancing communication understandability comprising:
   one or more of monitoring speech from a first participant in a conversation with a second participant or retrieving from a profile characteristics associated with the first participant;
   one or more of monitoring speech from the second participant in the conversation or retrieving from a profile characteristics associated with the second participant;
   identifying, by an enhancement understandability system having a processor and memory, characteristics that represent differences in style between the first and second participants; and
   utilizing one or more independently measurable components of speech that can affect understandability to provide an indication to each participant who is speaking of an estimated ease with which a participant in the conversation who is listening can understand the participant who is speaking.

2. The method of claim 1, further comprising weighing the characteristics that represent differences in style between the participants and combining them into a score.

3. The method of claim 2, further comprising providing the score to the speaking participant.

4. The method of claim 1, wherein the differences in style are one or more of accent, pronunciation accuracy, speed, pitch, cadency, intonation, co-articulation, syllable emphasis, syllable duration, native language information, grammar, vocabulary and idioms.

5. The method of claim 1, further comprising evaluating one or more indicators of engagement.

6. The method of claim 1, further comprising evaluating whether signal degradation exists on one or more legs of a communications architecture.

7. The method of claim 1, further comprising monitoring or retrieving from a profile characteristics associated with additional participants.

8. The method of claim 1, further comprising determining and presenting one or more recommendations on how to improve understandability.

9. The method of claim 8, wherein the one or more recommendations are provided via one or more of a whisper channel, a graphical user interface, a display and audibly.

10. One or more means for performing the method of claim 1.

11. A non-transitory computer readable information storage media having stored thereon instructions that, if executed by a processor, cause to be performed the method of claim 1.

12. A system to enhance communication understandability comprising:
   an analysis module that one or more of monitors speech from a first participant in a conversation with a second participant or retrieves from a profile characteristics associated with a first participant and further one or more of monitors speech from the second participant in the conversation or retrieves from a profile of characteristics associated with the second participant;

a modeling module that identifies characteristics that represent differences in style between the first and second participants; and a feedback module that utilizes one or more independently measurable components of speech that can affect understandability to provide an indication to each participant who is speaking of an estimated ease with which a participant in the conversation who is listening can understand the participant who is speaking.

13. The system of claim 12, further comprising a processor that weighs the characteristics that represent differences in style between the participants, combining them into a score.

14. The system of claim 13, further comprising a feedback module that provides the score to the speaking participant.

15. The system of claim 12, wherein the differences in style are one or more of accent, pronunciation accuracy, speed, pitch, cadency, intonation, co-articulation, syllable emphasis, syllable duration, native language information, grammar, vocabulary and idioms.

16. The system of claim 12, further comprising an engagement module that evaluates one or more indicators of engagement.

17. The system of claim 12, further comprising a signal quality module that evaluates whether signal degradation exists on one or more legs of a communications architecture.

18. The system of claim 12, wherein the analysis module further monitors or retrieves from a profile characteristics associated with additional participants.

19. The system of claim 12, wherein one or more recommendations on how to improve understandability are provided.

20. The system of claim 19, wherein the one or more recommendations are provided via one or more of a whisper channel, a graphical user interface, a display and audibly.

* * * * *